United States Patent [19]

Jamison et al.

[11] 3,979,650
[45] Sept. 7, 1976

[54] ENERGY CONVERSION APPARATUS FOR SUPPLYING VARIABLE VOLTAGE DIRECT CURRENT POWER TO AN ELECTRICALLY PROPELLED VEHICLE

[75] Inventors: Will B. Jamison, Bethel Park; John F. Burr, Pittsburgh, both of Pa.

[73] Assignee: Consolidation Coal Company, Pittsburgh, Pa.

[22] Filed: Dec. 4, 1974

[21] Appl. No.: 529,504

[52] U.S. Cl. ................................. 318/150; 322/4
[51] Int. Cl.² ........................................ H02K 7/02
[58] Field of Search ............. 310/74; 318/150; 322/4

[56] References Cited
UNITED STATES PATENTS

| | | | |
|---|---|---|---|
| 2,589,453 | 3/1952 | Storsand | 310/74 X |
| 2,783,393 | 2/1957 | Lindahl et al. | 322/4 |
| 3,158,750 | 11/1964 | Roes | 322/4 X |
| 3,436,572 | 4/1969 | Storsand | 310/74 |
| 3,477,013 | 11/1969 | Smith | 322/4 |
| 3,541,409 | 11/1970 | Storsand | 322/4 X |
| 3,679,960 | 7/1972 | Hirokawa et al. | 322/4 |
| 3,683,216 | 8/1972 | Post | 310/74 |
| 3,866,442 | 2/1975 | Kouril et al. | 322/4 X |

*Primary Examiner*—William M. Shoop

[57] ABSTRACT

A synchronous machine, operable as both a motor and a generator, is mounted on an electrically powered vehicle, such as a mine shuttle car, and includes a plurality of conductors having connections that are detachably engagable with receptacles of a stationary power bank. Engagement of the conductors with the receptacles supplies variable voltage alternating current power to the machine. The machine is drivingly connected to a flywheel on the vehicle and, operating as a motor, energizes the flywheel to store a preselected amount of mechanical energy. The electrical connection between the vehicle and the power bank is opened after the flywheel has been sufficiently charged. The stored energy in the flywheel is then available to drive the machine as a generator and produce high frequency, three phase, alternating current power. The generated power is transmitted to a full wave silicon controlled rectifier that converts the alternating current power to direct current for powering the traction motors of the vehicle. A variable voltage controller is connected to the rectifier and actuates the rectifier to supply direct current at a selected voltage level. The controller is responsive to an operator foot pedal. By manually depressing the foot pedal to a selected position, the voltage level of the rectified current is controlled. Thus, the speed of the traction motors is adjustable to propel the vehicle at a speed within a given range. After a portion of the energy stored by the flywheel is consumed, the vehicle is returned to the power bank to replenish the energy supply.

8 Claims, 6 Drawing Figures

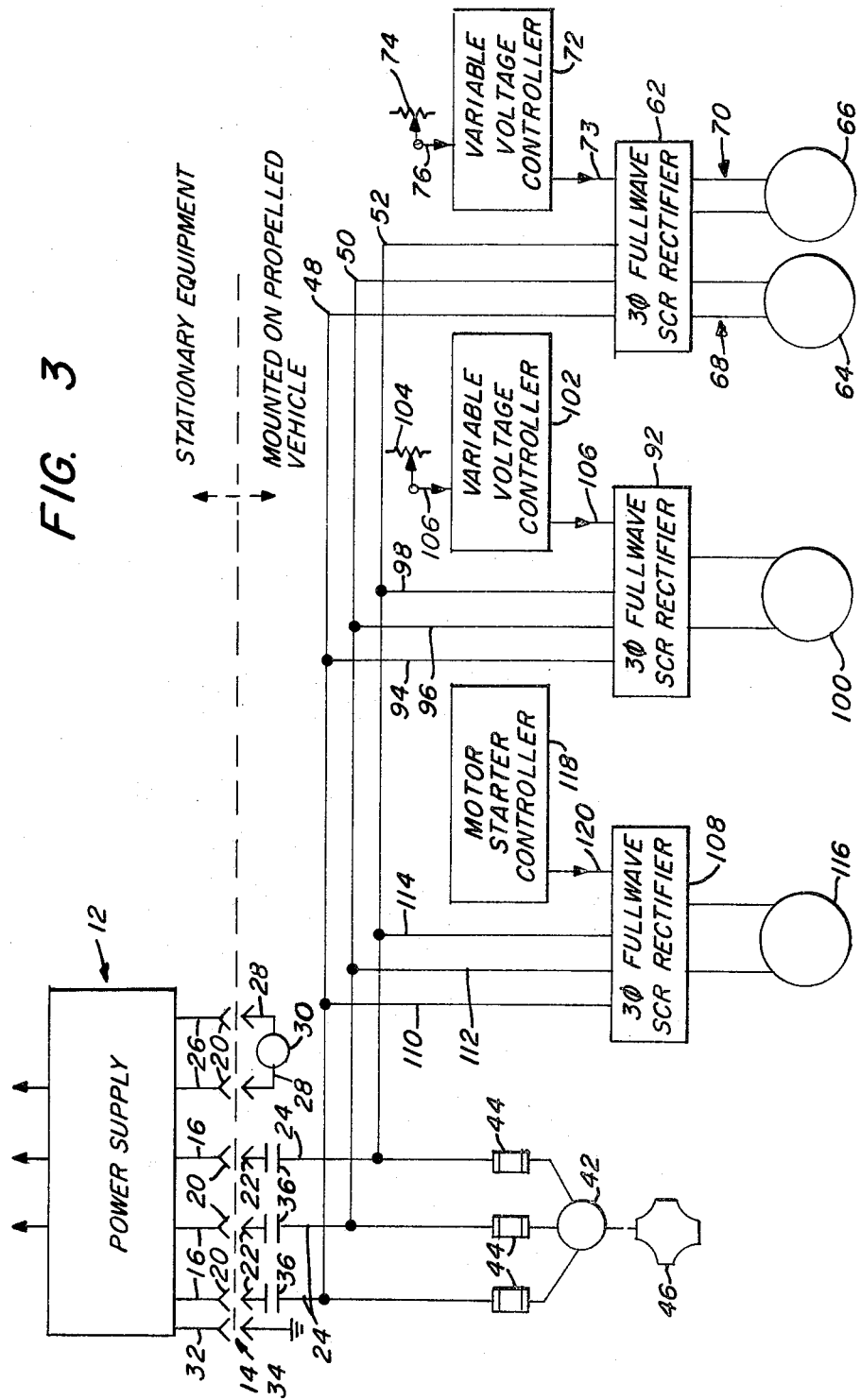

ENERGY CONVERSION APPARATUS FOR SUPPLYING VARIABLE VOLTAGE DIRECT CURRENT POWER TO AN ELECTRICALLY PROPELLED VEHICLE

BACKGROUND OF THE INVENTION

1. Field of the Invention

This invention relates to apparatus for converting mechanical energy to electrical energy on an electrically powered vehicle and more particularly, to apparatus for mechanically generating alternating current power and rectifying the generated power to variable voltage direct current power for propelling the vehicle at a preselected speed.

2. Description of the Prior Art

Conventional direct current powered vehicles, such as mine haulage vehicles, commonly known as "shuttle cars" are supplied with continuous power through a trailing cable that connects the remote direct power source with the machine load. Power from the trailing cable is directed to the traction motors which are driven to propel the vehicle. The motors run at a single speed and, therefore, do not permit speed adjustments unless the vehicle drive train includes a multi-speed transmission. Subsequently, the operator must control the speed of the vehicle by depressing a foot pedal to turn on the motor. When the vehicle has reached the desired speed or the maximum permissible speed, the operator removes his foot from the pedal. The motor is thus turned off and the power to the motor is terminated. The vehicle is permitted to "coast" to a lower speed. By depressing the foot pedal, the motor is again energized and the speed increased.

This method of maintaining the speed of the vehicle within a desired range by "jabbing" the foot pedal subjects the motor to a high starting current which produces undesirable heating of the motor and trailing cable. Furthermore, the high starting current produces excessive motor torque that subjects the gear train and drive shafts to severe mechanical shock and high accelerational loads. The ultimate outcome of controlling speed of the vehicle by jabbing is poor operating performance and high vehicle maintenance.

A starting resistor is commonly utilized to connect the series field motor with the power source to reduce the high inrush or current on starts. The contacts of a time delay relay are usually connected across the starting resistor to cut in or out a portion of the starting resistance or the entire resistance from the motor. In this fashion, the presence of the resistance in the motor circuit reduces the acceleration of the motor. Then, after a predetermined time, the contacts are closed and the current bypasses the resistance and the motor accelerates to full speed.

To reduce mechanical shock to the gearing and shafts and provide soft starting and stopping capability, a chopper circuit has been utilized for D.C. battery powered shuttle cars. The chopper circuit includes a motor and a silicon controlled rectifier that are serially connected to the direct current voltage source. The rectifier and the motor are also included in a resonant circuit that comprises additional rectifiers and an inductor and capacitor. A transient signal is established by turning the rectifiers on and off to thus allow the capacitor to charge and discharge and force the current through the motor to zero. The resultant effect is a pulsating current with modulation.

To avoid the problem of turning the traction motors on and off to control the tramming speed of A.C. and D.C. mine shuttle cars, one approach has been to supply the traction motors with one of three available voltages. A multiconductor trailing cable connects the machine load to a remote power source to supply the vehicle with three phase, 60-cycle alternating current power in the range of 480 volts. One or more traction motors are connected to the high alternating current voltage through a diode rectifier bridge and a transformer. The transformer primary winding is connected to the multi-conductors and energizes the secondary transformer winding. Taps are provided on the secondary winding and a normally open contactor connects each tap to the diode rectifier bridge. Thus, by selectively closing the contactors, three voltage levels are available for controlling the speed of the traction motors. A problem is encountered, however, by the low frequency of the voltage and the poor motor performance resulting therefrom.

There is need for apparatus that supplies high frequency alternating current power to the power equipment of an electrically operable vehicle for operating the equipment at a controlled speed and does not require the use of a trailing cable to supply the machine with power from a remote source. While it has been suggested by the prior art systems to control the speed of the power equipment, the prior art systems require the utilization of the trailing cable and either alternatingly starting and stopping the motors or switching contactors of transformer taps to adjust the motor speed.

SUMMARY OF THE INVENTION

In accordance with the present invention, there is provided energy conversion apparatus for supplying variable voltage direct current power to an electrically propelled vehicle that includes a flywheel mounted on the vehicle. An electrical machine, acting as a motor, supplies the flywheel with mechanical energy to be stored by the flywheel. The electrical machine operating as a generator and drivingly connected to the flywheel converts the stored mechanical energy of the flywheel to alternating current electrical power. A direct current powered motor is provided on the vehicle and is connected by a rectifier to the electrical generator. The rectifier is operable to convert the alternating current power produced by the electrical generator to direct current power for use by the motor. A controller is provided on the vehicle and is connected to the rectifier. The controller actuates the rectifier to supply the direct current power to the motor at a preselected voltage. In this manner, the speed of the motor is controlled.

The rectifier preferably is a fullwave silicon controlled rectifier which is triggered to conduct direct current to the vehicle motor at a preselected voltage in response to the signal transmitted by the controller. The controller is actuated to transmit a signal to the silicon controlled rectifier by an operator controllable member, such as a foot pedal, located at the operator's station. The foot pedal is manually positionable to send a reference signal to the controller. The controller responds to the reference signal by actuating the rectifier to conduct direct current power at a preselected voltage to the motor. Thus, the foot pedal functions as an acceleration pedal to increase or decrease the voltage at which the direct current is supplied to the motor as determined by the relative position of the foot pedal. In this manner, the speed of the motor is controlled, and in the case of the traction motor, permits adjusting the speed of the vehicle to thus limit the starting current and reduce the starting torque produced by the traction motor.

Another feature of the invention includes an automatic transmission controller that is connected by a current transformer to the synchronous machine. The alternating current from the synchronous machine operating as a generator energizes the transformer to provide the automatic transmission controller with a signal proportioned to the generator output current. The automatic transmission controller is interphased with the hydraulic circuitry of the vehicle. For a vehicle having a single motor for operating the electrical and hydraulic equipment on the vehicle the automatic transmission controller can adjust the speed of the vehicle without varying the speed of the single motor. This prevents excessive motor torque exerted on the gear train from the time the motor is started until the time it reaches full speed to thus provide soft starting and stopping of the vehicle.

Accordingly, the principal object of the present invention is to provide energy conversion apparatus operable to supply variable voltage direct current power to an electrically powered vehicle for propelling the vehicle at a preselected speed.

Another object of the present invention is to provide energy conversion apparatus on an electrically powered vehicle that includes a flywheel charged with a given quantity of mechanical energy which is converted to alternating current power and rectified on the vehicle to supply the traction motors with variable voltage direct current power.

A further object of the present invention is to provide on an electrically powered vehicle, apparatus that permits the operator to control the vehicle speed by controlling the voltage supplied to the direct current powered traction motors through an operator controllable member.

A still further object of the present invention is to provide apparatus on an electrically propelled vehicle for converting mechanical energy to electrical energy to propel the vehicle at a controlled speed.

These and other objects of this invention will be more completely described and disclosed in the following specification, the accompanying drawings and the appended claims.

BRIEF DESCRIPTION OF THE DRAWINGS

FIG. 3 is a schematic diagram, similar to FIG. 1, illustrating the use of variable voltage controllers for actuating rectifiers to supply variable voltage direct current power to specific power equipment and a motor starter controller.

DESCRIPTION OF THE PREFERRED EMBODIMENTS

Figure 1:
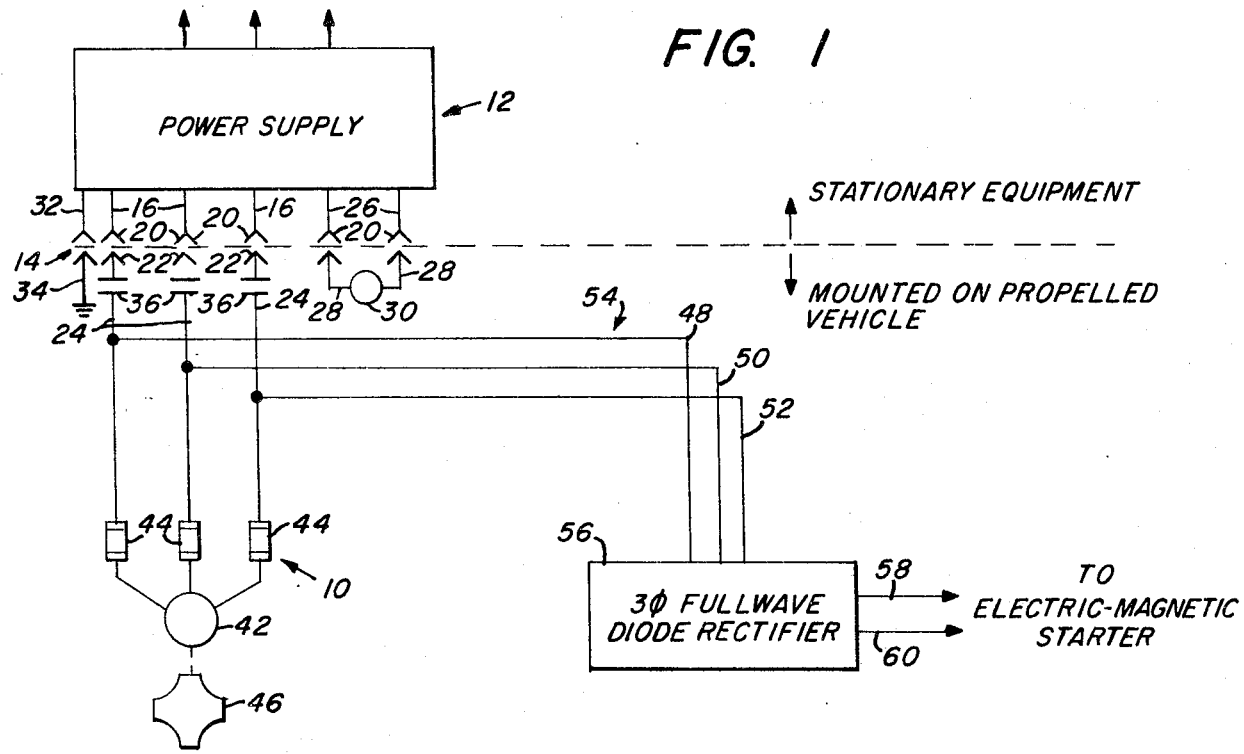
FIG. 1 is a schematic diagram illustrating the electrical and mechanical apparatus for producing and converting alternating current power to direct current power on an electrically powered vehicle.

Referring to the drawings, and more particularly to FIG. 1, there is illustrated apparatus for generating and converting alternating current power to direct current power on a vehicle having power equipment generally designated by the numeral 10. The vehicle may be any electrically powered vehicle that utilizes direct current power to propel the vehicle and to accomplish other electrically powered functions on the vehicle. An example of such an electrically powered vehicle is a mine haulage vehicle, such as a shuttle car, that includes one or more D.C. motors for propelling the vehicle and operating hydraulic pumps, conveyors and the like.

Alternating current power is supplied to the vehicle through a stationary power supply bank generally designated by the numeral 12. The power supply bank 12 is fixed at a location remote from the operation of the vehicle and functions to supply the vehicle with three phase, alternating current power at variable frequency, preferably in the range between 200 and 400 Hz. The power bank 12 includes an electrical connection 14 having conductors 16 and 26 connected to receptacles 20 that are arranged to receive plugs 22 on conductors 24 and 28 of the vehicle. Conductors 28 are connected to a coil 30 that is also provided on the vehicle.

A ground connection is provided between the vehicle and the power bank 12 by conductor 32 having a receptacle arranged to engage the plug of conductor 34 connected to the vehicle frame. Thus, when the plug of conductor 34 is engaged to the receptacle of conductor 32 at the power bank 12 conductors 16 are connected to conductors 24, and conductors 26 are connected to conductors 28. Conductors 26 and 28 connect the coil 30 to a low magnitude voltage supply. When coil 30 is energized normally open contacts 36 on conductors 24 are closed. Consequently, alternating current power is supplied from the power bank 12 through the conductors 16 to the vehicle through conductors 24.

The conductors 24 are connected to a synchronous machine 42, that is selectively operable as either a motor or a generator, through fuses 44. The synchronous machine 42 is mounted on the vehicle and is drivingly connected to a flywheel 46. The alternating current power from the bank 12 is conducted to the synchronous machine 42 and is transmitted therefrom to the flywheel 46. The flywheel 46 is rotated and thereby supplied with a preselected amount of mechanical energy. In this manner, the machine 42 functions as a motor for supplying mechanical energy to the flywheel 46. After a preselected amount of mechanical energy has been stored by the flywheel 46, the electrical connection between the vehicle and the power bank at the connection point 14 is broken. With a given quantity of mechanical energy stored in the flywheel 46, the vehicle, as in the case of a mine haulage vehicle or shuttle car, may be propelled to a selected point in the mine for operation. Thus, the conventional trailing cable for supplying electrical power to the shuttle car is eliminated.

Once the flywheel 46 has been charged to a desired energy level, as for example with 4 kw.-hr. of energy, and the connection between the vehicle and the power bank is broken, the mechanical energy of the flywheel 46 is transformed to alternating current power by the machine 42, functioning as a generator. Thus, in the preferred embodiment of the present invention, the synchronous machine 42 functions as a motor by accepting electrical energy from the power bank 12 and charging the flywheel 46 with mechanical energy when the vehicle 14 is connected to the power bank 12. Then, when the vehicle 14 is disconnected from the power bank 12 the synchronous machine functions as a generator by accepting mechanical energy from the flywheel and providing electrical energy to the electrical devices on the vehicle. For example, the machine 42 first functions as a motor operating at 240 to 480 volts at a frequency in the range between 200 and 400 Hz. to charge the flywheel 46 with 4 kw.-hr. of energy. The machine 42 then functions as a generator to receive the mechanical energy of the flywheel 46 to produce 180 volts of alternating current power at a frequency in the range between 200 and 400 Hz. for rectification on the vehicle.

In accordance with the practice of the present invention, if 2 kw.-hr. of the 4 kw.-hr. of energy available on the vehicle is consumed during the operation of the vehicle, the vehicle must return to the power bank 12 for recharging prior to consumption of the remaininng 2 kw.-hr. of power. Then the flywheel 46 is recharged to restore all or a portion of the 4 kw.-hr. of energy consumed. Accordingly, the greater the energy consumption, the greater the time required for replenishing the supply of energy.

The three phase alternating current power produced by the motor-generator 42 is conducted therefrom through the conductors 24 to the conductors 48, 50 and 52 of cable 54. Cable 54 is connected to a three phase full wave diode rectifier 56. The diode rectifier 56 converts the alternating current power developed by the generator 42 to the direct current power. A three phase full wave diode rectifier suitable for use in the present invention is illustrated and described in *Standard Handbook For Electrical Engineers*, published by McGraw Hill Book Co. The direct current is transmitted from the rectifier 56 through conductors 58 and 60 to a conventional electromagnetic starter provided on the vehicle. Thus, with the above described arrangement, alternating power is produced by transforming the mechanical energy of the flywheel 46 to electric energy through the motor-generator 42 to provide direct current power on the shuttle car. For example, 180 volts alternating current power produced on the shuttle car may be converted to 240 volts direct current power for operation of the traction motors. The provision of the flywheel 46 and the motor-generator 42 to produce alternating current power for rectification eliminates the necessity of supplying direct current power to the controller through trailing conductors.

Figure 2:
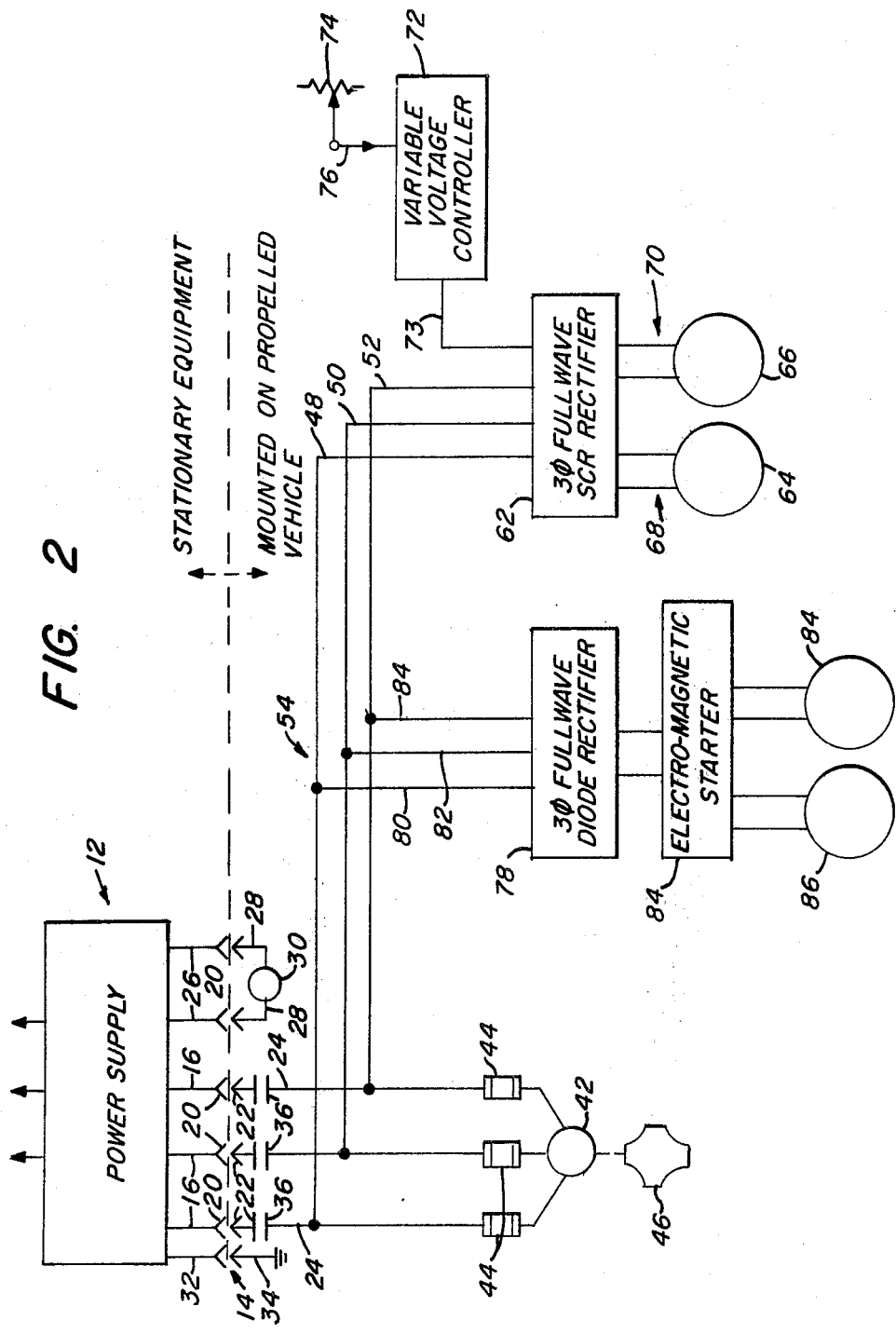
FIG. 2 is a schematic diagram, similar to FIG. 1, illustrating a variable voltage controller that actuates the silicon controlled rectifier to provide the vehicle traction motors with variable voltage direct current power.

Referring to FIG. 2, in which like numerals refer to like parts illustrated in FIG. 1, the conductors 48, 50 and 52 of the cable 54 conduct three phase alternating current power to a conventional three phase fullwave silicon controlled rectifier 62. The rectifier 62 supplies direct current to the traction motors 64 and 66 through lines 68 and 70. The traction motors 64 and 66 are directly coupled to the gearing of the vehicle drive train by which the vehicle is propelled. An example of a preferred silicon controlled rectifier for use in the present invention is illustrated and described in *SCR Manual* distributed by the Semiconductor Product Dept. of General Electric Co.

The voltage at which the silicon controller rectifier conducts direct current to traction motors 64 and 66 is controlled by a conventional variable voltage controller 72 that is connected to rectifier 62 by conductor 73. The variable voltage controller 72 controls the voltage at which rectifier 62 conducts direct current to traction motors 64 and 66 to, in turn, limit the direct current supplied to the traction motors. Thus, the traction motors 64 and 66 are permitted to run at a preselected speed. A variable voltage controller suitable for use in the present invention is sold by Power Control Corp. of Pittsburgh, Pennsylvania 15238.

The capability of limiting the current of the traction motors 64 and 66 and thus the speed thereof, reduces the starting torque produced by the motors and the initial mechanical shock transmitted to the vehicle drive train. Furthermore, by limiting the starting current with the voltage controller 72, the need for starting resistors associated with the traction motors and shifting the traction motors from series to parallel connection is eliminated. In this manner, the traction motors 64 and 66 are prevented from initially drawing excessive amounts of power that produce undesirable heating of the motors.

The variable voltage controller 72 is actuated by an operator controller member 74 that is connected to the controller through conductor 76. The operator controllable member 74 is preferably a foot pedal located at the operator's station and is positionable to actuate the varible voltage controller 72 which, in turn, controls the gating of the rectifier 62 or the voltage at which the rectified current is conducted from the rectifier 62 to the traction motors 64 and 66.

Basically, foot pedal 74 functions as a tram acceleration pedal or a throttle and provides the reference signal to the controller 72. As determined by the relative position of the foot pedal 74, the controller 72 is actuated to control the gating of the rectifier 62 and thereby adjust the voltage at which direct current is supplied to the traction motors 64 and 66. Thus, the controller 72 monitors the reference signal transmitted by the foot pedal and compares the reference signal with the voltage of the rectified current flowing through the silicon controlled rectifier 62.

The silicon controlled rectifier 62 remains nonconductive when the three phase, alternating current power from the motor-generator 42 passes through zero to provide zero current unless the gate of the rectifier 62 is triggered. Accordingly, the rectifier 62 is triggered by the foot pedal 74. The rectifier 62 conducts and supplies adjustable voltage direct current to the traction motors 64 and 66 until the alternating current signal from the motor-generator 42 passes through zero. By depressing foot pedal 74 to an intermediate position, the silicon controlled rectifier 62 becomes conductive at the middle of the voltage cycle. Therefore, half voltage is rectified. When the foot pedal 74 is fully depressed, full voltage is rectified.

The alternating current power is supplied to the rectifier 62 at a frequency in the range between 200 and 400 Hz. Traction motors 64 and 66, because of the high frequency of the voltage, cannot distinguish between the silicon controlled rectifier 62 conducting and not conducting. Consequently, continuous half voltage is supplied to the motors when the foot pedal is depressed to an intermediate position and continuous full voltage is supplied when the foot pedal is fully depressed. Thus, full line direct current power is supplied to the traction motors 64 and 66 with the foot pedal 74 in a fully depressed position. In this manner, by controlling the gating of the rectifier 62 through the controller 72 by the relative position of the foot pedal 74, the operator is able to adjust the speed of the traction motors 64 and 66 and the torque produced thereby.

In addition to the silicon controller rectifier 62 for supplying adjustable voltage direct current power to the traction motors 64 and 66, a three phase, fullwave diode rectifier 78 of the type above described is connected to the conductors of cable 54 by conductors 80, 82 and 84. The diode rectifier 78 converts the alternating current power supplied by the motor-generator 42 to direct current at a preselected voltage. The direct current flows to an electromagnetic starter 84 that actuates conveyor motor 86 and pump motor 88. With this arrangement, the diode rectifier 78 provides a constant line voltage for operating the motors, preferably at 240 volts D.C.

Referring to FIG. 3, there is illustrated another embodiment of the present invention in which a silicon controller rectifier 92 of the type above described receives alternating current power from the conductors 48, 50 and 52 through conductors 94, 96 and 98. The silicon controlled rectifier 92 converts the alternating current power to direct current power for operation of the conveyor motor 100. A variable voltage controller 102, such as the controller 72, is actuated by a foot pedal 104 to supply a signal through the conductor 106 to control the gating of the silicon controlled rectifier 92. As hereinabove described, foot pedal 104 functions as a throttle to actuate the controller 102 and supply a signal through conductor 106 to gate the rectifier 92. By controlling the gating of the rectifier 92 through the foot pedal 104, adjustable direct current voltage is produced for controlling the speed of the conveyor motor 100.

In a similar arrangement, silicon controlled rectifier 108, such as rectifier 92, receives alternating current power through conductors 110, 112 and 114 from the cable 54 and produces direct current power for operation of the pump motor 116. A motor starter controller 118 is connected to the rectifier 108 through conductor 120. The motor starter controller 118 limits the voltage of the rectified current that is supplied to the pump motor 116 during starting by controlling the gating of the silicon controlled rectifier 108. In this manner, the rate of increase of the voltage supplied to the motor 116 is limited. The voltage is increased at a constant rate until the motor 116 reaches maximum speed. This feature permits soft starting of the motor 116, and at maximum speed, the motor 116 operates at full line voltage. A suitable motor starter controller for use in the present invention is sold by Power Control Corp. of Pittsburgh, Pennsylvania 15238.

The advantages attained with the present invention are exemplified in a comparison with known apparatus in that by limiting the current initially supplied to the motor as it is started, the conventional starting resistor of the motor may be eliminated and current overloads of the motor 116 are avoided. In addition, the controller 118 as well as the controllers 72 and 102 for rectifiers 62 and 92, respectively, by regulating the power that is supplied to the motors 116, 100 and 64 and 66 serve to conserve the total amount of energy available on the vehicle through the flywheel 46. Thus, energy is not wastefully supplied to the various motors and only that which is required for the operation of the motor at a selected speed is supplied.

Figure 4:
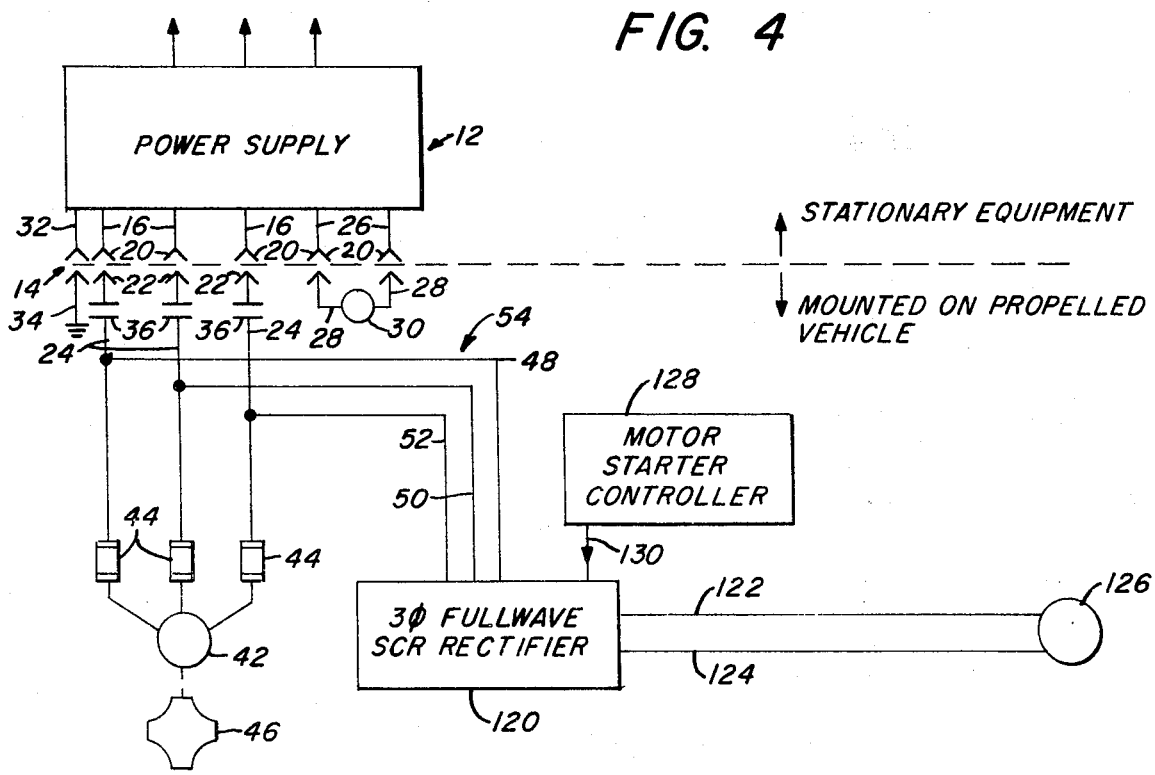
FIG. 4 is a schematic diagram illustrating a motor starter controller connected to the silicon controlled rectifier for limiting the voltage of the rectifier direct current supplied to the motor until the motor reaches full speed.

Referring to FIG. 4, there is illustrated a three phase fullwave silicon controller rectifier 120 of the type illustrated in FIGS. 2 and 3 that rectifies three phase alternating current produced by the motor-generator 42 to direct current power. The rectifier 120 is connected by conductors 122 and 124 to a single traction motor 126 for propelling the vehicle. A motor starter controller 128, such as controller 118 illustrated in FIG. 3, is connected to rectifier 120 by conductor 130. The motor starter controller 128 limits the voltage of the rectifier current that is supplied to motor 126 during starting by controlling the gating of the silicon controlled rectifier 120. In this manner, the rate of increase of the voltage supplied to the motor 126 is limited. The voltage can be increased at a constant rate until the motor 126 reaches maximum speed. This feature provides soft starting of the motor 126, and at maximum speed the motor 126 operates at full line voltage.

Figure 5:
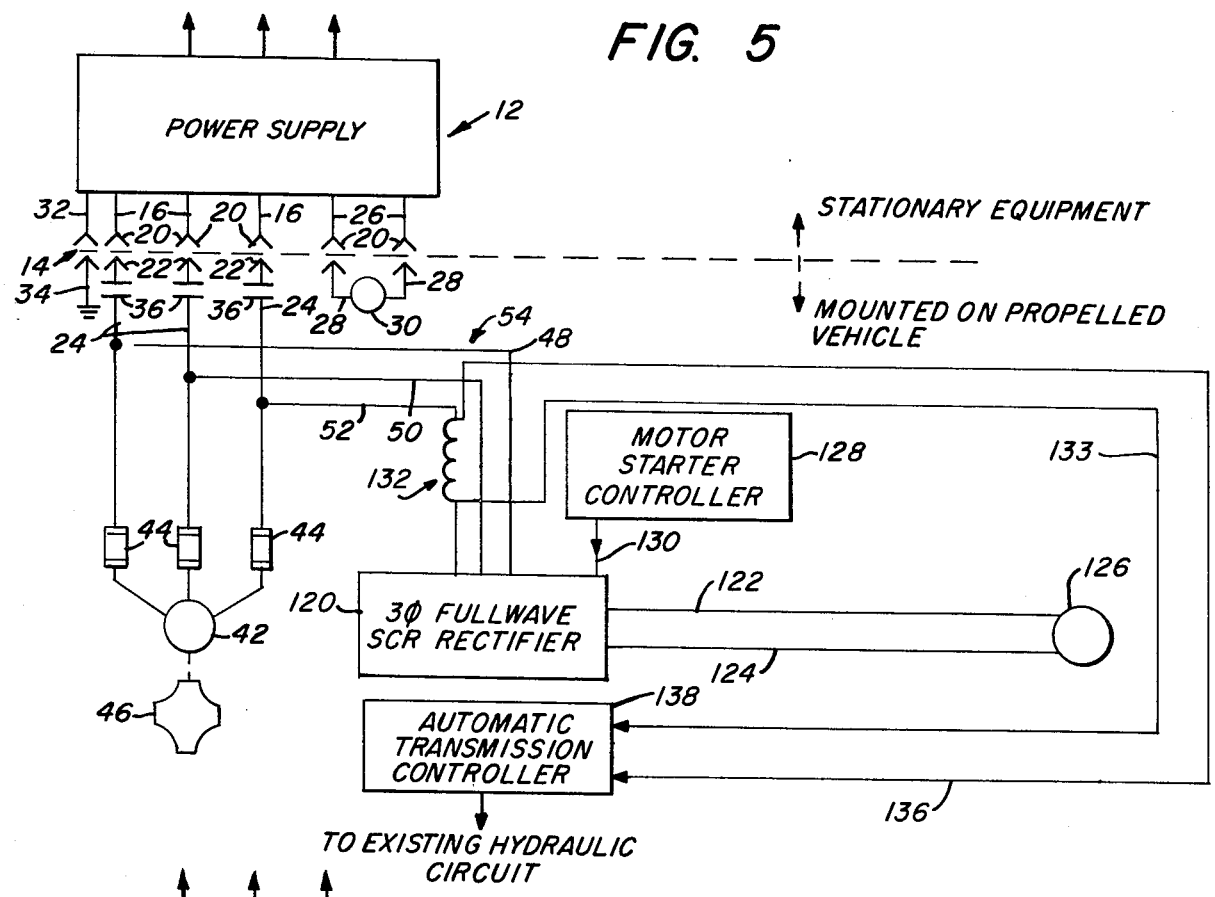
FIG. 5 is a schematic diagram, illustrating an automatic transmission controller interphased with the hydraulic circuit of the vehicle to provide variable speed of the vehicle.

In FIG. 5 there is illustrated another embodiment of the present invention similar to that illustrated in FIG. 4 for a vehicle having the single direct current powered motor 126 for powering the electrical hydraulic equipment on the vehicle. The motor starter controller 128 is connected to the rectifier 120 by the conductor 130. An automatic transmission controller 138 is connected to a current transformer 132 that is coupled to the conductors of cable 54 by conductors 133 and 136. The automatic transmission controller 138 is interphased with the existing hydraulic circuitry of the vehicle. The single motor 126 provided on the vehicle, such as a shuttle car, drives the vehicle wheels through a three speed gear box and a conventional torque converter with direct gearing to the hydraulic pump. With this arrangement, the speed of the motor 126 cannot be varied to adjust the vehicle speed.

The controller 138 energizes the solenoids that operate valve devices that, in turn, control the low, intermediate and high speed clutches of the drive transmission. In this manner, an automatic speed adjustment is provided for the vehicle as compared with the manual adjustment normally available. An automatic transmission controller suitable for use in the above described apparatus is sold by Controlled Systems, Inc. of Fairmont, West Virginia 26554.

Figure 6:
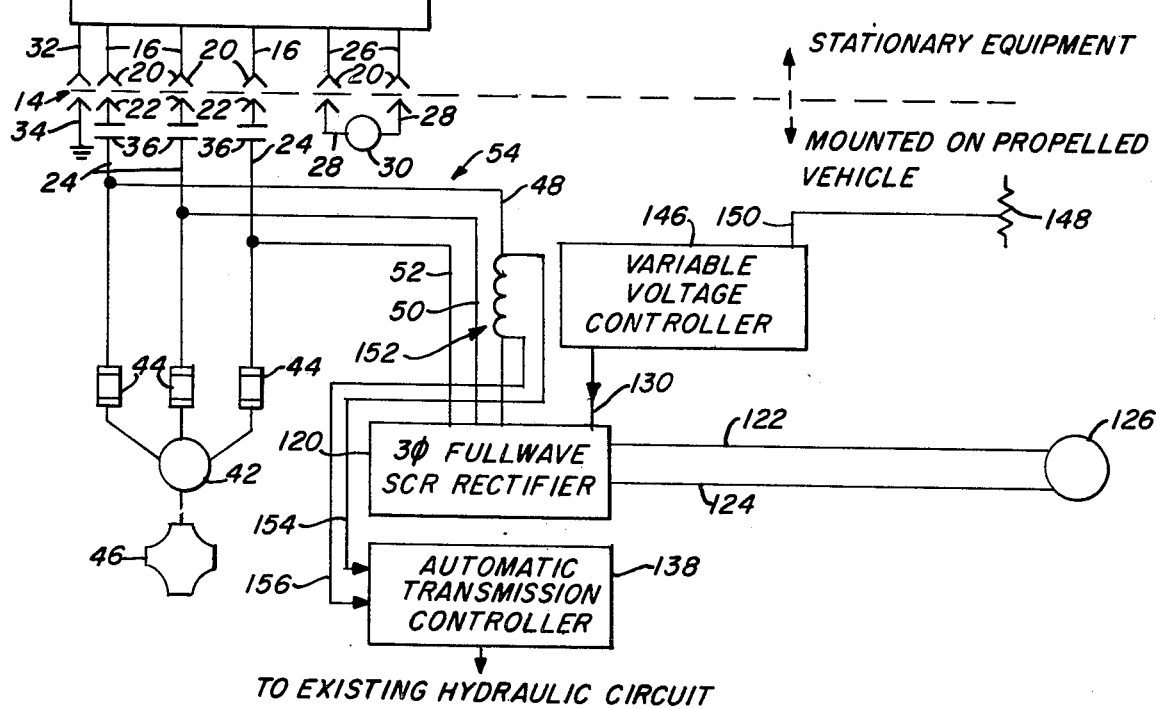
FIG. 6 is a schematic diagram similar to FIG. 5, illustrating a variable voltage controller in combination with the automatic transmission controller for providing variable speed adjustment of the vehicle.

The embodiment illustrated in FIG. 6 utilizes both the variable voltage controller 146 and the automatic transmission controller 138. Controller 146 receives reference signals from the foot switch 148 through conductor 150. The automatic transmission controller 138 receives a signal proportional to the motor current from current transformer 152 through conductors 154 and 156. The variable voltage controller 146 triggers the rectifier 120 to run the motor 126 at a desired speed. The automatic transmission controller 138 actuates the solenoids of the valve devices to control the operation of the vehicle speed clutches. In this manner, an automatic and completely variable speed adjustment is provided for the vehicle as compared with the manual three speed adjustment normally available.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. In an energy conversion apparatus for supplying variable voltage direct current power to an electrically powered vehicle having a flywheel mounted on the vehicle, power means for supplying mechanical energy to said flywheel to be stored by said flywheel, and electrical generating means mounted on the vehicle and drivingly connected to said flywheel for transforming the stored mechanical energy of said flywheel to alternating current power, the improvement comprising, a direct current powered motor provided on the vehicle, rectifying means connecting said electrical generating means to said motor for converting said alternating current power to direct current power to be supplied to said motor, and controller means provided on the vehicle and connected to said rectifying means for controlling said rectifying means to supply direct current power to said motor at a preselected voltage, and operator controllable means for actuating said controller means to control the voltage of the rectified current conducted from said rectifying means to said motor and thereby control the speed of said motor.

2. In an energy conversion apparatus for supplying variable voltage direct current power to an electrically powered vehicle the improvement, as set forth in claim 1 which includes, said operator controllable means operable to generate a reference signal for actuating said controller means to control the gating of said rectifying means and thereby adjust the voltage of the rectified current to said motor and thus the speed of said motor.

3. In an energy conversion apparatus for supplying variable voltage direct current power to an electrically powered vehicle the improvement, as set forth in claim 1 in which said operator controllable means includes, a foot pedal connected to said controller means and manually actuated to transmit a reference signal to said controller means as determined by the relative position of said foot pedal, and said rectifying means responsive to the relative position of said foot pedal and said reference signal transmitted therefrom to supply direct current power to said motor at a preselected voltage and thereby control the speed of said motor.

4. In an energy conversion apparatus for supplying variable voltage direct current power to an electrically powered vehicle the improvement, as set forth in claim 1 which includes, motor starter controller means for controlling said rectifying means to supply said direct current power to said motor at a constantly increasing rate until said motor reaches maximum speed.

5. In an energy conversion apparatus for supplying variable voltage direct current power to an electrically powered vehicle the improvement, as set forth in claim 1 which includes, means for propelling said vehicle, transmission means for drivingly connecting said motor to said propelling means, said transmission means having a clutch mechanism for controlling the speed of said vehicle, a current transformer connected to said electrical generating means, an automatic transmission controller connected to said current transformer and operable to receive a signal proportional to the current passing through said current transformer, said automatic transmission controller being coupled to said clutch mechanism of said transmission means and operable to permit selective adjustment of the speed of the vehicle in response to the direct current power passing through said current transformer.

6. In an energy conversion apparatus for supplying variable voltage direct current power to an electrically powered vehicle the improvement, as set forth in claim 5 which includes, said controller means being operable to supply said direct current power to said motor at a constantly increasing rate until said motor reaches maximum speed.

7. In an energy conversion apparatus for supplying variable voltage direct current power to an electrically powered vehicle the improvement, as set forth in claim 1 in which said rectifying means includes, a fullwave silicon controlled rectifier operable to supply said direct current power to said motor at a preselected voltage and thereby control the speed of said motor and the torque produced thereby.

8. In an energy conversion apparatus for supplying variable voltage direct current power to an electrically powered vehicle the improvement, as set forth in claim 1 which includes, said power means being detachably connectable to a stationary power source for receiving variable frequency alternating current power.

* * * * *